United States Patent
Jang et al.

(10) Patent No.: US 9,004,254 B2
(45) Date of Patent: Apr. 14, 2015

(54) PARKING BRAKE SYSTEM

(75) Inventors: Sung Wook Jang, Hwaseong-si (KR); Tae Whan Kim, Yongin-si (KR); Da Hui Kim, Seongnam-si (KR)

(73) Assignee: Hyundai Motor Company, Seoul (KR)

( * ) Notice: Subject to any disclaimer, the term of this patent is extended or adjusted under 35 U.S.C. 154(b) by 606 days.

(21) Appl. No.: 13/315,192

(22) Filed: Dec. 8, 2011

(65) Prior Publication Data
US 2013/0020171 A1    Jan. 24, 2013

(30) Foreign Application Priority Data
Jul. 21, 2011   (KR) ........................ 10-2011-0072556

(51) Int. Cl.
| | |
|---|---|
| *B60W 10/18* | (2012.01) |
| *B60T 11/04* | (2006.01) |
| *B60T 1/00* | (2006.01) |
| *F16H 63/34* | (2006.01) |

(52) U.S. Cl.
CPC .............. *B60T 11/046* (2013.01); *B60T 1/005* (2013.01); *F16H 63/3416* (2013.01); *F16H 63/3483* (2013.01); *F16H 63/3491* (2013.01)

(58) Field of Classification Search
CPC ............ F16H 63/3483; F16H 63/3416; F16H 63/3491; F16H 63/3475; F16H 63/3458
USPC ..................................... 192/219, 219.4, 219.6
See application file for complete search history.

(56) References Cited

U.S. PATENT DOCUMENTS

| | | | | |
|---|---|---|---|---|
| 6,378,393 | B1 * | 4/2002 | Bates ......................... | 74/473.18 |
| 6,481,556 | B1 * | 11/2002 | Haupt ........................ | 192/219.5 |
| 6,928,896 | B2 * | 8/2005 | Burgbacher et al. ........... | 74/335 |
| 8,161,837 | B2 * | 4/2012 | Giefer et al. ............... | 74/473.26 |
| 2003/0144112 | A1 | 7/2003 | Burgbacher et al. | |
| 2010/0107800 | A1 | 5/2010 | Sickart | |

FOREIGN PATENT DOCUMENTS

| | | | |
|---|---|---|---|
| JP | 2763683 | B2 | 6/1998 |
| JP | 3377953 | B2 | 2/2003 |
| WO | WO2004031623 | * | 4/2004 |

OTHER PUBLICATIONS

WO2004031623 machine translation.*

* cited by examiner

*Primary Examiner* — David D Le
*Assistant Examiner* — Colby M Hansen
(74) *Attorney, Agent, or Firm* — Morgan, Lewis & Bockius LLP

(57) ABSTRACT

A parking brake system that uses a locking device to maintain a parking release condition may include a control lever that may be rotatably connected to the exterior of a transmission, a shift cable that may be rotatably connected to an end of the control lever, the locking device that may be connected to the other end of the shift cable and selectively maintains the parking release condition, and a parking device that includes a piston member in a cylinder and that may be connected to the end of the control lever and uses hydraulic pressure to move the control lever and the shift cable such that the parking release condition may be maintained.

12 Claims, 7 Drawing Sheets

(a)

(b)

PARKING BRAKE SYSTEM

CROSS-REFERENCE TO RELATED APPLICATION

The present application claims priority to Korean Patent Application No. 10-2011-0072556 filed in the Korean Intellectual Property Office on Jul. 21, 2011, the entire contents of which is incorporated herein for all purposes by this reference.

BACKGROUND OF THE INVENTION

1. Field of the Invention

The present invention relates to a parking brake system. More particularly, the present invention relates to a parking brake system that uses a locking device that is prepared outside an automatic transmission to maintain a speed of the transmission.

2. Description of Related Art

Generally, as SBW (shift by wire) system transfers a demand of a driver to a TCU (transmission control unit) to release a parking condition through a hydraulic pressure, which is operated by a smaller force to provide comfort to a driver compared to a conventional TGS (transmission gear speed) lever (P/R/N/D).

If the hydraulic pressure of a piston member is deteriorated while the parking is released, the transmission can enter into a mechanical parking condition and therefore a locking device is to be prepared to prevent the mechanical parking.

In a conventional art, a locking device that is connected to a piston that is operated by hydraulic pressure of a transmission is prepared, to maintain the locking condition while the current is released. Accordingly, when the vehicle is stopped in an N (neutral) condition of a transmission, there is a problem that a battery can die.

That is, an NL (normal low) type of solenoid was used in a conventional art, and the NL type of solenoid valve maintains a locking condition while the current is being supplied thereto and releases the locking condition while the current is not supplied thereto.

In a conventional art, when a vehicle is stopped in an N speed, the transmission enters into a parking mode (P) speed. When the vehicle is stopped in an N speed and the NL type of solenoid valve is used to maintain the N speed, current is supplied to release a parking condition of the TCU, however, the current is to be continuously supplied to maintain the condition and therefore there is a problem that a battery can die.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a parking brake system having advantages of actively controlling a parking mode (P) or a mode (R/N/D) excluding the parking mode by using a piston that is operated by hydraulic pressure in a transmission and maintaining an N speed when a vehicle is stopped in an N speed by maintaining a locking condition of each shift speed while the vehicle is stopped.

In an aspect of the present invention, a parking brake system that uses a locking device to maintain a parking release condition, may include a control lever that is rotatably connected to the exterior of a transmission, a shift cable that is rotatably connected to an end of the control lever, the locking device that is connected to the other end of the shift cable and selectively maintains the parking release condition, and a parking device that may include a piston member in a cylinder and that is connected to the end of the control lever and uses hydraulic pressure to move the control lever and the shift cable such that the parking release condition is maintained.

The locking device may include a locking lever that is connected to the other end of the shift cable and selectively rotated by the shift cable, a locking pin that is slidably disposed in the locking lever to ascend and descend, a locking spring that elastically supports the locking pin, and a detent that is disposed at an upper end side of the locking pin wherein an engagement position of the locking pin with the detent is varied by rotation of the locking lever according to a stage of a shift speed.

The locking device may further include a rotation shaft that is disposed at a lower end portion of the locking lever such that the locking lever rotates based on the rotation shaft.

The parking brake system may further include a locking release link that contacts the locking pin and rotates based on a hinge that is formed therein.

An end of the locking release link is coupled to a solenoid valve and selectively operated thereby.

An emergency button is disposed at an upper end side of the locking release link and the locking release link actuated by the emergency button moves the locking pin to change the engagement position to implement a parking mode in an emergency.

The emergency button is operated by an e-shifter parking button.

The detent is formed as a step structure having at least a step according to a stage of a shift speed in the transmission.

An oil supply hole is formed at one side of the cylinder to selectively supply oil to the piston member.

The parking brake system may include a pinion gear that is formed at a lower end portion of the locking lever, and a rack gear that is selectively engaged with the pinion gear and rotates the pinion gear formed to the locking lever to release an emergency parking mode.

The rack gear is disposed at a pushrod, and a return spring is connected to a lower end portion of the pushrod.

The rack gear is disposed without being engaged with the pinion gear when the return spring extends with a predetermined amount.

An emergency parking release hole is formed at an upper end portion of the locking lever to move the locking pin to a position of a parking mode.

The transmission does not enter into a mechanical parking mode of the transmission even though the hydraulic pressure of the piston member is deteriorated while the vehicle is running in a release condition of the parking mode in exemplary embodiments of the present invention.

Also, an NH type of solenoid valve for maintaining a locking condition when a current is released is used to continuously maintain an N speed when the vehicle is stopped in an N speed such that the battery of the vehicle does not die.

Also, a cable and a link device for entering an emergency parking mode, which is generated when a, NH type is used in a transmission, can be reduced.

Also, an SBW motor, which is necessary when a solenoid valve of a NL type is used, can be eliminated, and the emergency parking can be easily released by using a lever in case of emergency.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
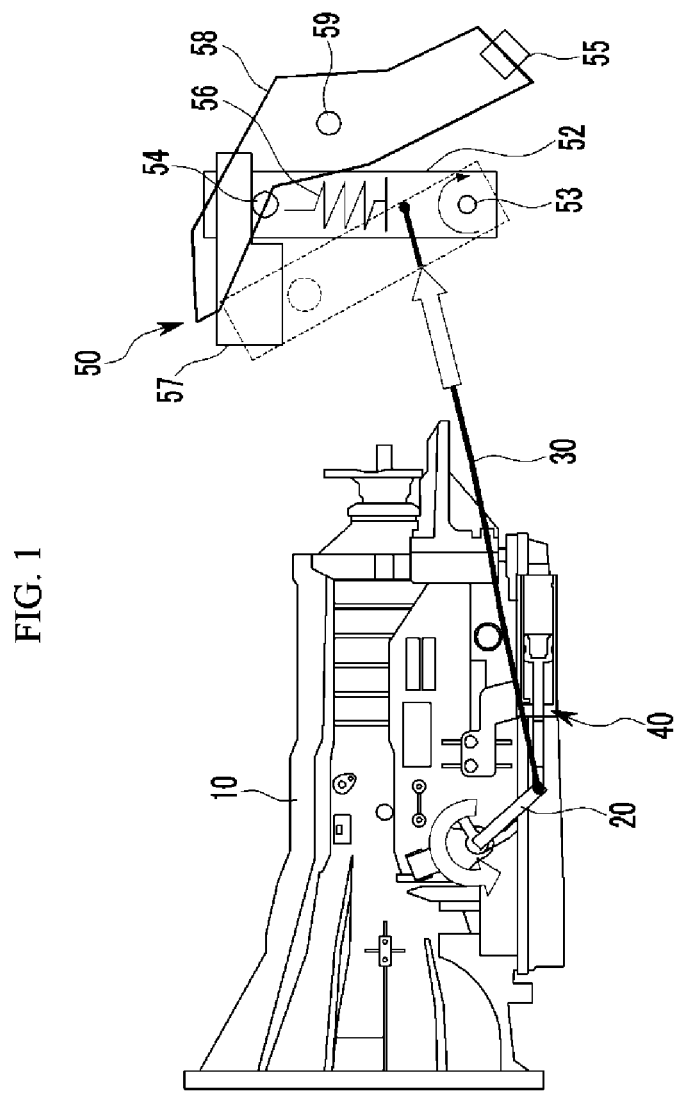
FIG. 1 is a schematic diagram of a locking device in a mode other than a parking mode according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, with reference to the accompanying drawings, the present invention will be described in order for those skilled in the art to be able to implement the invention.

Hereinafter, referring to FIG. 1 and FIG. 2, a parking brake system will be described according to an exemplary embodiment of the present invention.

A locking device according to an exemplary embodiment of the present invention includes a control lever 20 that is rotatably disposed outside an automatic transmission 10, a hard type of shift cable 30 that is connected to one end portion of the control lever 20, a locking device 50 that is connected to the shift cable 30 to maintain a parking release condition, and a parking device 40 that includes a piston member 42 that is connected to the control lever 20 to determine a shifted gear of a transmission and a cylinder 44 through which the piston member 42 is inserted.

The locking device 50 is connected to the shift cable 30 to be rotated based on a rotation shaft 53 that is formed at a lower end portion, and includes a locking lever 52 of which a locking pin 54, which is formed outside the locking lever 52, is supported by a locking spring 56, and a detent 57 that contacts the locking pin 54 to be formed as a step shape such that the position where it contacts the locking pin 54 is varied according to a step of a shift speed of a transmission.

Also, the locking device 50 is formed at one side of the locking lever 52 to rotate based on a hinge 59, and further includes a locking release link 58 of which one end thereof can press the locking pin 54. In this case, the locking release link 58 is operated by a solenoid valve 55 that is connected to the locking release link 58.

Figure 2:
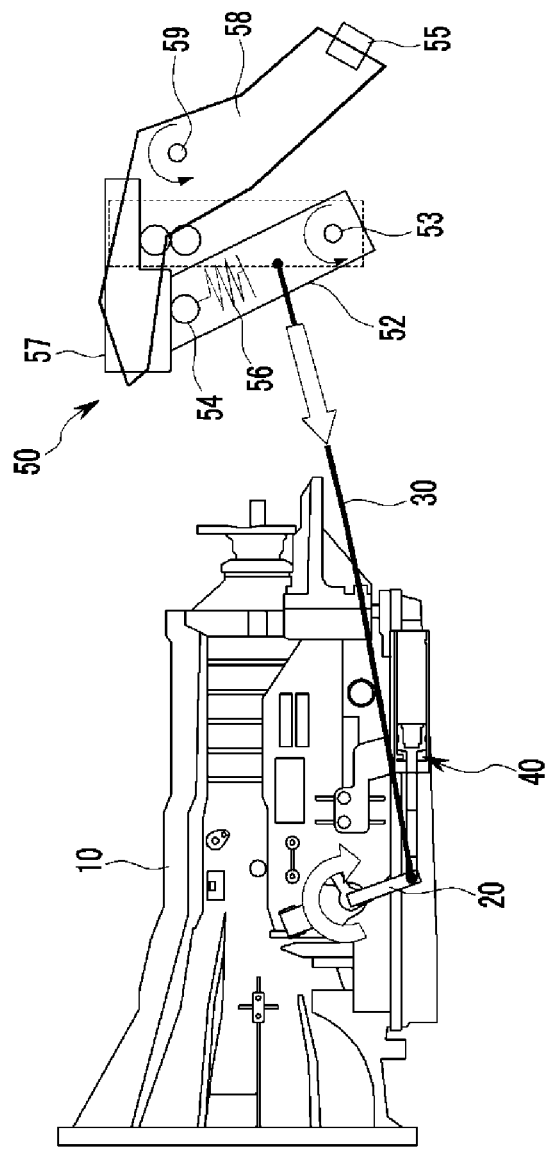
FIG. 2 is a schematic diagram of a locking device in a parking mode according to an exemplary embodiment of the present invention.

As shown in FIG. 1 and FIG. 2, a step of a shift speed is determined according to a position of the locking pin 54, which can be positioned in a parking mode (P) or another mode (NOT P) excluding the parking mode.

Also, according to an exemplary embodiment of the present invention, an emergency parking release slot (not shown) and an emergency parking release hole (not shown) are formed on the locking lever 52 so as to release the parking mode in case of emergency, wherein the tool 86 is installed in the emergency parking release hole (not shown) and the park mode can be released by depressing the tool 86.

Figure 5:
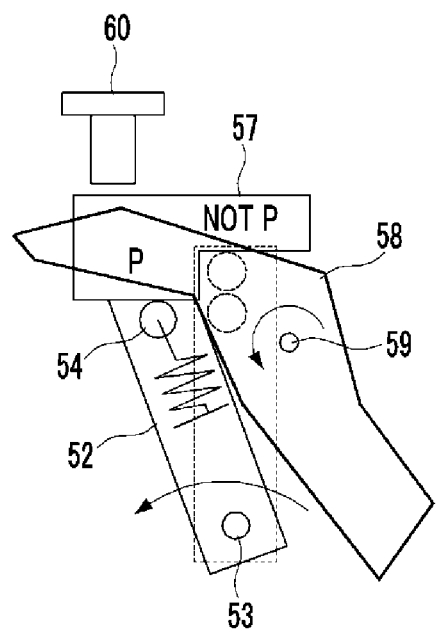
FIG. 5 is a schematic diagram of a locking device for describing an entry into a parking mode for an emergency.

FIG. 5 is a cross-sectional view of the locking lever 52 and the locking release link 58 for describing entering into a parking mode in case of emergency according to an exemplary embodiment of the present invention. Referring to FIG. 5, an emergency button 60 is disposed at an upper portion of the detent 57, and when the emergency button 60 is pressed, the locking pin 54 descends and is positioned in a parking mode (P) by the locking release link 58 such that the transmission enters into a parking mode.

Further to the above method, a parking button of an e-shifter that is disposed at a shift lock release position of an SBC (shift by cable) vehicle is configured to have a two step button type, wherein when the parking button is pressed in a first step, it is operated in a normal condition, and when the parking button is pressed in a second step, it functions as the emergency button 60 in case of emergency.

Figure 6:
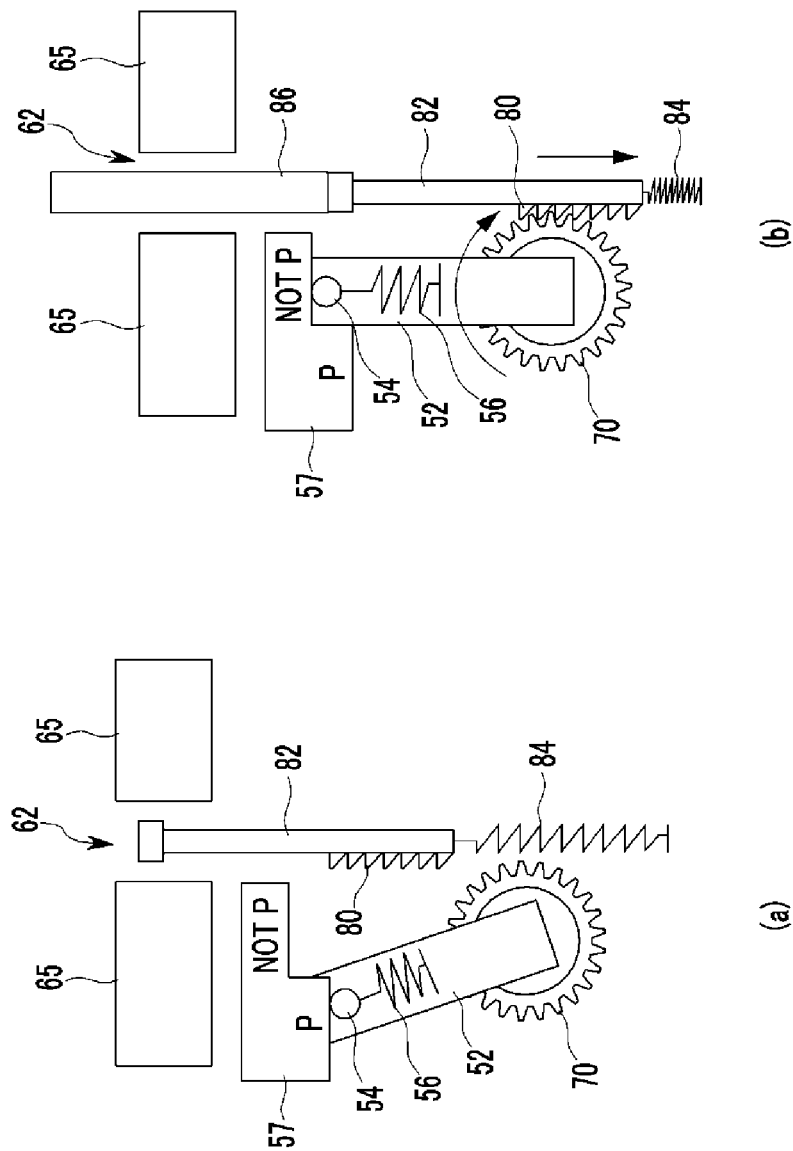
FIG. 6 and FIG. 7 are cross-sectional views of a locking device for describing a method for releasing a parking mode for an emergency according to an exemplary embodiment of the present invention.

According to an exemplary embodiment of the present invention, as shown in FIG. 6, in case of emergency such as trouble with a controller or a dead battery, a groove 62 is formed in a board 65 around an e-shifter of an SBW vehicle, a pushrod 82 in which a rack gear 80 is formed is disposed in the groove 62, and a pinion gear 70 that can be engaged with the rack gear 80 is integrally formed with a lower end portion of the locking lever 52, and when the pinion gear 70 and the rack gear 80 are engaged with each other, the locking lever 52 can be rotated. When the locking lever 52 rotates, the parking mode can be changed to the other mode (NOT P). In the above, the push road 82 descends so as to combine the rack gear 80 with the pinion gear 70, wherein the push rod 82 can be pressed by inserting a tool 86 such as a driver through the groove 62 around the e-shifter.

For this, a return spring 84 is disposed at a lower end portion of the push rod 82 such that the rack gear 80 cannot be engaged with the pinion gear 70 in a normal operating condition.

Also, according to an exemplary embodiment of the present invention, an emergency parking release slot (not shown) and an emergency parking release hole (not shown) are formed on the locking lever 52 so as to release the parking mode in case of emergency, wherein the tool 86 is installed in the emergency parking release hole (not shown) and the park mode can be released by depressing the tool 86.

Hereinafter, an operation procedure of a locking device according to an exemplary embodiment of the present invention will be described.

Firstly, referring to FIG. 1, a locking procedure is described when a parking mode is changed to a mode other than the parking mode.

Figure 3:
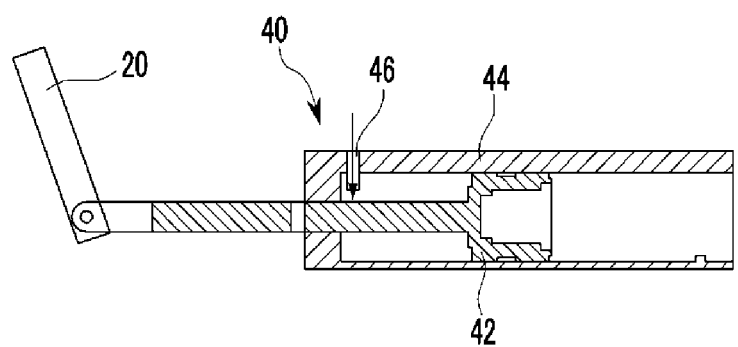
FIG. 3 is a cross-sectional view of a parking device according to an exemplary embodiment of the present invention.
Figure 3:
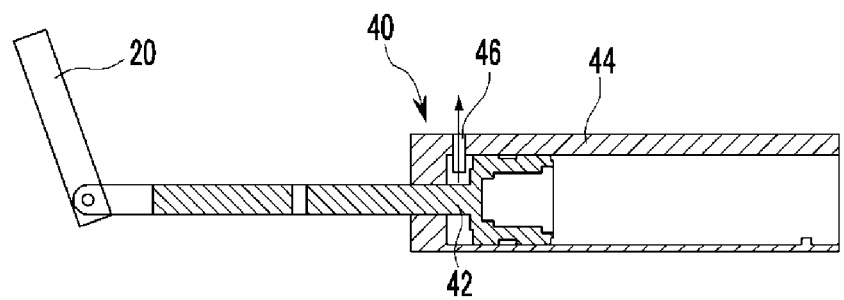

If a TCU receives an entry signal of a gear speed (D, R, N) other than a parking mode from a driver's manipulation, hydraulic pressure of the transmission 10 is controlled to be supplied to the piston member 42. That is, the hydraulic pressure is supplied through an oil supply hole 46 to move the piston member to right side, as shown in (a) of FIG. 3. The piston member 42 pushes the shift cable 30 in the arrow direction as shown in FIG. 1, wherein the shift cable 30 is a hard type to be connected to the control lever 20 that is formed outside the transmission 10. The locking lever 52 that is connected to the shift shaft 53 is rotated by the movement of the shift cable 30 based on the rotation shaft 53. While the locking lever 52 rotates in a clockwise direction, the locking pin 54 ascends by an elastic force of the locking spring 56 supporting the locking pin 54 such that the lever 52 can be positioned in the other mode (NOT P) excluding the parking mode. The locking condition of the other mode (NOT P) excluding the parking mode is thereby maintained.

In this condition, although the parking hydraulic pressure is released, the locking pin 54 is fixed by the stepped detent 57, and therefore the shift cable 30 and the piston member 42 prevent entry into the parking mode. At this moment, the locking release link 58 that is disposed at an upper end portion of the locking pin 54 rotates in a clockwise direction together with the locking lever 52 while the locking pin 54 is ascending.

Hereinafter, referring to FIG. 2, a locking process will be described in a case that a parking mode is changed to the other mode excluding the parking mode according to an exemplary embodiment of the present invention.

If the TCU receives a parking mode signal from a driver's manipulation, current is supplied to the solenoid valve 55 for releasing the locking. If the current is transferred to the solenoid valve 55, the locking release link 58 rotates in a counter-clockwise direction based on the hinge 59 to lower the locking pin 54. The locking pin 54 descends to be positioned at a position where the locking is released. That is, the locking pin 54 is not fixed by the detent 57 and therefore if the locking lever 52 is withdrawn it is able to be rotated.

Here, the hydraulic pressure of the transmission 10 is controlled to not be supplied to the piston member 42. That is, the oil is exhausted to the outside through the oil supply hole 46. As shown in (b) of FIG. 3, the piston member moves to the left side.

As shown in FIG. 2, while the control lever 20 that is connected to the piston member 42 rotates in a clockwise direction, the shift cable 30 is drawn to the left side along an arrow direction. The locking lever 52 that is connected to the shift cable 30 is drawn to be rotated in a counter-clockwise direction and the locking pin 54 is positioned at a parking mode (P) such that the parking mode is locked and maintained while the vehicle is stopped.

A locking of a parking brake is maintained in a parking mode by the method that is stated above.

Figure 4:
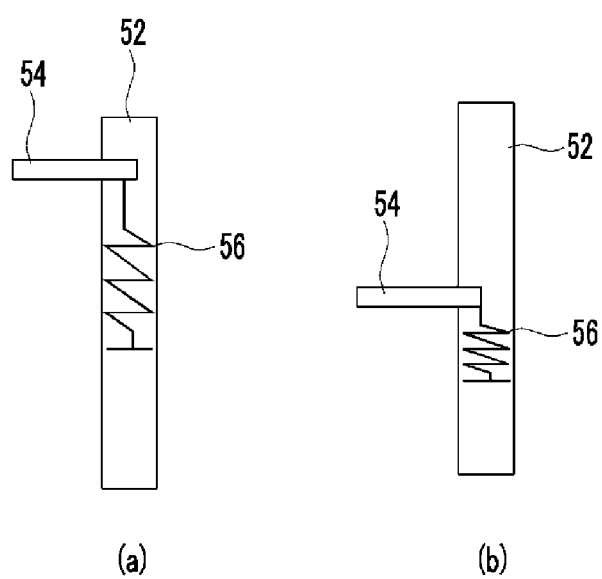
FIG. 4 is a cross-sectional side view of a locking lever and a locking pin according to an exemplary embodiment of the present invention.

FIG. 4 is a cross-sectional side view showing a position of a locking pin 54 of each gear speed according to an exemplary embodiment of the present invention, wherein (a) of FIG. 4 shows the other mode excluding the parking mode and (b) of FIG. 4 shows a position of the locking pin 54 in the parking mode. The position of the locking pin 54 is disposed at the lower side in the parking mode, and the position of the parking mode (P) is lower than that of the other mode (NOT P) in the step of the detent 57.

Hereinafter, referring to FIG. 5, it is described that the mode enters into a parking mode in case of emergency according to an exemplary embodiment of the present invention.

The emergency button 60 is disposed at an upper portion of the locking release link 58, which is used to enter into a parking mode in case of emergency such as a dead battery and a problem with the controller or the solenoid valve 55 for releasing the locking state in an exemplary embodiment of the present invention, wherein the emergency button 60 is pushed to rotate the locking release link 58 in a counter-clockwise direction. That is, if the locking release link 58 is pushed by the emergency button 60, the locking release link 58 rotates in a counter-clockwise direction based on the hinge 59, and therefore the locking pin 54 is released and the locking lever 52 is rotated in a counter-clockwise direction.

The e-shifter parking button has two steps such that the mode can enter into the parking mode in case of emergency in an exemplary embodiment of the present invention. That is, if the button is slightly pushed, the system is normally operated to electrically enter into a parking mode, and if the button is deeply pushed, the system is mechanically operated to make the emergency button 60 push the locking release link 58 such that the mode can enter into the emergency parking mode.

If a driver deeply pushes the emergency button 60 or the e-shifter parking button, it is described that the system can mechanically enter into a parking mode in the above, in a case that the system cannot enter into a parking mode because of a problem with the solenoid valve 55 while the vehicle is stopped.

Hereinafter, referring to FIG. 6 and FIG. 7, a method for releasing a parking mode in case of an emergency such as a dead battery or a problem with a controller will be described.

As a method for releasing an emergency parking mode for rotating the locking lever 52, gear engagement between the pinion gear 70 and the rack gear 80 is used according to an exemplary embodiment of the present invention. That is, the pinion gear 70 that is formed at a lower end portion of the locking lever 52 is integrally combined with the locking lever 52. A groove 62 is formed in a board 65 around an SBW e-shifter and the pushrod 82 to which the rack gear 80 is formed is disposed at a lower side of the groove 62. The pinion gear 70 does not engage with the rack gear 80 because of the return spring 84 in a normal condition such that noise can be minimized. If a tool 86 such as a driver is inserted into the groove 62 to push the pushrod 82 in case of emergency, as shown (b) of FIG. 6, the rack gear 80 descends to engage with the pinion gear 70 such that the pinion gear 70 rotates in a clockwise direction. The locking lever 52 is thereby rotated in a clockwise direction such that the locking pin 54 changes its position from the parking mode (P) to the other mode (NOT P).

Figure 7:
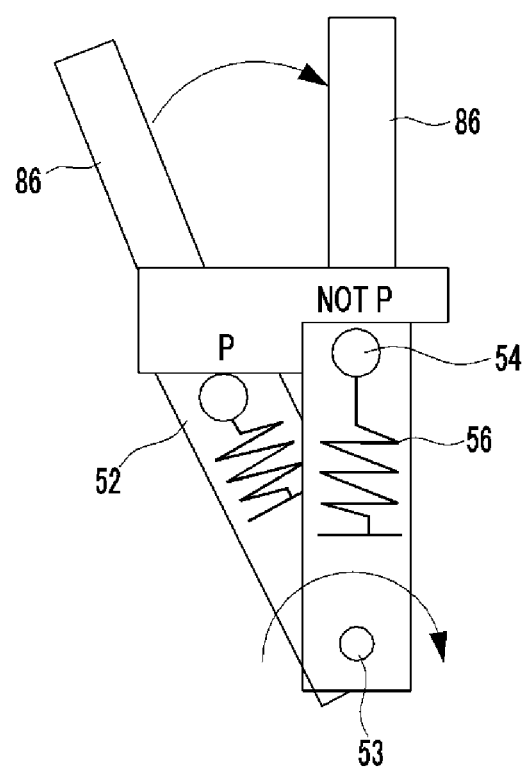

Also, as a method for releasing an emergency parking mode, a method as shown in FIG. 7 is introduced according to an exemplary embodiment of the present invention. That is, an emergency parking release slot (not shown) is formed at an upper end portion of the locking lever 52, an emergency parking release hole (not shown) is formed in the emergency parking release slot, the tool 86 is disposed in the emergency parking release hole (not shown), and the parking condition can be released by depressing the tool 86.

After the parking condition is released, the locking pin 54 is locked to maintain the parking mode release condition.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A parking brake system that uses a locking device to maintain a parking release condition, comprising:
    a control lever that is rotatably connected to an exterior of a transmission;
    a shift cable, one end of which is rotatably connected to an end of the control lever;
    the locking device that is connected to the other end of the shift cable and selectively maintains the parking release condition; and
    a parking device that includes a piston member in a cylinder and that is connected to the end of the control lever and uses hydraulic pressure to move the control lever and the shift cable such that the parking release condition is maintained,
    wherein the locking device includes:
        a locking lever that is connected to the other end of the shift cable and selectively rotated by the shift cable;
        a locking pin that is slidably disposed in the locking lever to ascend and descend relative to the locking lever;
        a locking spring that elastically supports the locking pin; and
        a detent that is disposed at an upper end side of the locking pin wherein an engagement position of the locking pin with the detent is varied by rotation of the locking lever according to a stage of a shift speed.

2. The parking brake system of claim 1, wherein the locking device further includes a rotation shaft that is disposed at a lower end portion of the locking lever such that the locking lever rotates about the rotation shaft.

3. The parking brake system of claim 1, further including a locking release link that contacts the locking pin and rotates by a hinge that is formed therein.

4. The parking brake system of claim 3, wherein an end of the locking release link is coupled to a solenoid valve and selectively operated thereby.

5. The parking brake system of claim 3, wherein an emergency button is disposed at an upper end side of the locking release link and the locking release link actuated by the emergency button moves the locking pin to change the engagement position to implement a parking mode in an emergency.

6. The parking brake system of claim 5, wherein the emergency button is operated by a parking button.

7. The parking brake system of claim 1, wherein the detent is formed as a step structure having at least a step according to a stage of a shift speed in the transmission.

8. The parking brake system of claim 1, wherein an oil supply hole is formed at one side of the cylinder to selectively supply oil to the piston member.

9. The parking brake system of claim 1, further including:
    a pinion gear that is formed at a lower end portion of the locking lever; and
    a rack gear that is selectively engaged with the pinion gear and rotates the pinion gear formed to the locking lever to release an emergency parking mode.

10. The parking brake system of claim 9, wherein the rack gear is disposed at a pushrod, and a return spring is connected to a lower end portion of the pushrod.

11. The parking brake system of claim 10, wherein the rack gear is disposed without being engaged with the pinion gear when the return spring extends with a predetermined amount.

12. The parking brake system of claim 9, wherein an emergency parking release hole is formed at an upper end portion of the locking lever to move the locking pin to a position of a parking mode.

\* \* \* \* \*